United States Patent [19]

Siler

[11] Patent Number: 4,607,552
[45] Date of Patent: Aug. 26, 1986

[54] APPARATUS FOR AUTOMATICALLY CONTROLLING THE POSITION OF A PLURALITY OF SLITTERS

[75] Inventor: Steven J. Siler, Beloit, Wis.

[73] Assignee: Beloit Corporation, Beloit, Wis.

[21] Appl. No.: 763,850

[22] Filed: Aug. 8, 1985

Related U.S. Application Data

[63] Continuation-in-part of Ser. No. 593,688, Mar. 26, 1984, abandoned, which is a continuation of Ser. No. 443,573, Nov. 22, 1982, abandoned, which is a continuation of Ser. No. 208,520, Nov. 20, 1980, abandoned.

[51] Int. Cl.$^4$ .................................................. B26D 5/00
[52] U.S. Cl. ............................................. 83/71; 83/72; 83/499; 83/502
[58] Field of Search ................... 83/62.1, 71, 72, 482, 83/498, 499, 501, 502, 504, 508.3, 520, 522; 364/471, 475; 51/165.88

[56] References Cited

U.S. PATENT DOCUMENTS

| | | | |
|---|---|---|---|
| 3,176,566 | 4/1965 | Patterson, Jr. | |
| 3,427,518 | 2/1969 | Cloup | 364/475 X |
| 3,488,479 | 1/1970 | Keyes et al. | 83/71 X |
| 3,540,340 | 11/1970 | Koskela | 83/499 |
| 3,651,723 | 3/1972 | Gallagher, Jr. et al. | 83/71 X |
| 3,691,698 | 9/1972 | Schaller | 51/165.88 |
| 3,886,833 | 6/1975 | Gunn et al. | 83/504 X |
| 4,077,291 | 3/1978 | Obenshain | 83/499 |
| 4,224,847 | 9/1980 | Tokuno | 83/71 |
| 4,252,044 | 2/1981 | Yamashita et al. | 83/482 X |

FOREIGN PATENT DOCUMENTS 1043004 11/1978 Canada.

Primary Examiner—Robert P. Olszewski
Attorney, Agent, of Firm—Dirk J. Veneman; Raymond W. Campbell; David J. Archer

[57] ABSTRACT

An apparatus is disclosed for automatically controlling the position of a plurality of slitters for slitting a moving web. A slitter blade and a slitter band are secured respectively to a first and second housing members such that the slitter band cooperates with the slitter blade for slitting the web between the slitter blade and the band. An electronic control is connected to a first and second motor for selectively positioning the blade and band adjacent to each other. The electronic control includes a first and second control module secured to a first and second motor respectively. A digital control computer is connected to the modules for selectively controlling movement of the modules by sending the modules to a designated location using a predetermined number of stepping increments. A monitor is connected to the computer for displaying the position of the slitter blade and the band and a communication bus sequentially conducts control signals from the computer to the modules and sequentially conducts command signals from the modules to the computer for positioning the slitter blade and the band adjacent to each other. A wear detection switch is disposed adjacent the blade for detecting slitter blade wear, the detection switch being electrically connected to the first control module such that when the slitter blade wears, a wear detection signal is generated and conducted from the first module to the computer for compensating for such slitter blade wear.

9 Claims, 3 Drawing Figures

APPARATUS FOR AUTOMATICALLY CONTROLLING THE POSITION OF A PLURALITY OF SLITTERS

CROSS-REFERENCE TO EARLIER RELATED APPLICATIONS

The present application is a continuation-in-part of Applicant'application, Ser. No. 593,688 filed Mar. 26, 1984 now abandoned which was a continuation of an earlier Application Ser. No. 443,573 filed Nov. 22, 1982 now abandoned which was a continuation of an earlier application Ser. No. 208,520 filed Nov. 20, 1980 now abandoned. All the disclosure of the aforementioned applications are incorporated by reference into the present application.

BACKGROUND OF THE INVENTION

1. Field of the Invention

This invention relates to an apparatus for automatically controlling the position of a plurality of slitters for slitting a moving web.

More particularly, this invention relates to an apparatus for automatically controlling the position of a plurality of slitters for slitting a moving web of paper into a plurality of individual reels.

2. Information Disclosure Statement

In the papermaking art, individual customer orders specify particular reel width requirements. Consequently, a roll of paper on a winder which may be 260 or more inches (660.40 CMS) in width must be slit into a plurality of individual reels having the width specified in the order.

Traditionally, such slitting of a paper roll has necessitated the manual sliding of a plurality of slitter blades and slitter bands transversely relative to a paper web and the careful adjustment of each blade and corresponding slitter band to obtain the required reel widths.

Such manual adjustment of the slitter blades and slitter bands has not only proved to be a time-consuming operation but additionally, due to wear of the respective slitter blades, difficulties have been experienced with the production of reels that meet customer tolerances.

In the prior art, proposals have been set forth in which such slitter blades and slitter bands may be moved transversely relative to the moving web by means of electronic control mechanisms. However, such prior art proposals have not combined features enabling a completely computerized control system incorporating means for compensating for slitter blade wear.

U.S. Pat. No. 3,176,566 to Patterson teaches a remotely positioned slitter system for controlling the transverse disposition of a slitter blade and cooperating slitter band. However, Patterson does not teach a computer controlled positioning system or the use of a display monitor for displaying the relative dispositions of the blades and bands.

U.S. Pat. No. 3,488,479 to Keyes et al describes a slitter positioning system including a digital computer for controlling a plurality of slitter motors. However, the Keyes disclosure does not teach a control module associated with each respective blade and band.

U.S. Pat. No. 4,077,291 to Obenshain discloses a web slitting apparatus but it does not disclose a wear detection switch in combination with a computer control.

U.S. Pat. No. 4,252,044 to Yamashita et al discloses an automatic cutter positioning device for a gang slitter.

U.S. Pat. No. 3,540,340 to Koskela discloses a longitudinal sheet cutter.

U.S. Pat. No. 3,427,518 to Cloup discloses a digitally controlled positioning device.

U.S. Pat. No. 3,886,833 to Gunn et al teaches an apparatus for remotely positioning a web slitter.

U.S. Pat. No. 3,651,723 to Gallagher Jr. et al relates to a corrugated paperboard slitter scorer.

U.S. Pat. No. 3,691,698 to Shaller teaches an abrasive element dimension sensing mechanism.

U.S. Pat. No. 4,224,847 to Tokuno teaches a tool positioning apparatus which is adapted to position by numerical control a plurality of pairs of tools attached to a pair of parallel shafts.

Canadian Pat. No. 1,043,004 assigned to Jagenberg-Werk AG discloses a device which adjusts the spacing between a plurality of elements for cutting strip material lengthwise.

None of the aforementioned prior art proposals teach, in combination, an apparatus for automatically controlling the position of a plurality of slitters such that the slitters may be sent to designated locations and automatically adjusted to compensate for blade wear.

Therefore, it is a primary object of the present invention to provide an apparatus for automatically controlling the position of a plurality of slitters that overcomes the aforementioned inadequacies of the prior art proposals and provides a control system including a significant contribution to the art of web slitting.

Another object of the present invention is the provision of an apparatus for automatically controlling the position of a plurality of slitters including an electronic control connected to a first and second driving means for selectively positioning the slitter blade and band adjacent to each other such that the web moving between the slitter blade and band is sheared by the interaction of the slitter with the band.

Another object of the present invention is the provision of an apparatus for automatically controlling the position of a plurality of slitters in which the control means includes a first control module secured to the first driving means and a second control module secured to the second driving means.

Another object of the present invention is the provision of an apparatus for automatically controlling the position of a plurality of slitters for slitting a moving web in which the control means includes a digital control computer connected to the modules for selectively controlling the modules and for sending the modules to a designated location along the rails.

Another object of the present invention is the provision of an apparatus for automatically controlling the position of a plurality of slitters including a monitor connected to the control computer for displaying the positions of the respective slitter blade and band.

Another object of the present invention is the provision of an apparatus for automatically controlling the position of a plurality of slitters in which a communication bus means connects the control computer and the modules for sequentially conducting control signals from the computer to the modules and for sequentially conducting command signals from the modules to the computer for positioning the slitter blade and band adjacent to each other.

Another object of the present invention is the provision of an apparatus for automatically controlling the position of a plurality of slitters in which a wear detection switch means is disposed adjacent to the slitter blade for detecting slitter blade wear. The detection switch is connected to the first control module such that when the slitter blade wears a wear detection signal is generated and conducted from the first module to the computer for compensating for such slitter blade wear.

Another object of the present invention is the provision of an apparatus for automatically controlling the position of a plurality of slitters in which the driving means are stepping motors.

Another object of the present invention is the provision of an apparatus for automatically controlling the position of a plurality of slitters in which the control means includes a first and second comparator for detecting and counting signals from magnetic calibration disposed along the first and second rails respectively such that the first and second modules are sent to the designated locations along the rails using a predetermined number of stepping motor increments.

Another object of the present invention is the provision of an apparatus for automatically controlling the position of a plurality of slitters in which the wear detection switch means includes a proximity switch controlled by eddy currents generated in the vicinity of the slitter blade for positioning the slitter blade relative to the band.

Other objects of the present invention will be apparent to those skilled in the art from the detailed description and drawings of the present application.

SUMMARY OF THE INVENTION

This invention relates to an apparatus for automatically controlling the position of a plurality of slitters for slitting a moving web. The apparatus includes a first rail disposed adjacent to a first face of the web, the first rail defining a first indexing rack. A second rail is disposed adjacent to a second face of the web such that the first and second rails are disposed on opposite sides of the web, the second rail defining a second indexing rack. A first housing member is movably connected to the first rail such that the first housing member moves transversely relative to the web along the first indexing rack. A second housing member is movably connected to the second rail such that the second housing member moves transversely relative to the web along the second indexing rack. A slitter blade is rotatably secured to the first housing member for slitting the moving web during movement of the web between the slitter blade and the second housing member. A first driving means is secured to the first housing member for driving the first housing member and the slitter blade transversely relative to the web. A slitter band is secured to the second housing member for cooperating with the slitter blade for slitting the web between the slitter blade and the band. A second driving means is secured to the second housing member for driving the second housing member and the band transversely relative to the web. An electronic control means electrically connects the first and second driving means for selectively positioning the slitter blade and band adjacent to each other such that the web moving between the slitter blade and band is sheared by the interaction of the slitter blade with the band. The control means also includes a first control module secured to the first driving means and a second control module secured to the second driving means. A digital control computer is connected to the modules for selectively controlling movement of the modules by sending the modules to a designated location using a predetermined number of driving means increments. A monitor is connected to the control computer for displaying the positions of the slitter blade and band. A communication bus means electrically connects the control computer and the modules for sequentially conducting control signals from the computer to the modules and for sequentially conducting command signals from the modules to the computer for positioning the slitter blade and band adjacent to each other. A wear detection switch means is disposed adjacent to the slitter band for detecting slitter blade wear. The detection switch means is electrically connected to the first control module such that when the slitter blade wears a wear detection signal is generated and conducted from the first module to the computer for compensating for such slitter blade wear.

More specifically, the first driving means also includes a first motor and a first gearbox driven by the first motor, the first gearbox being drivingly connected to the first rack. A first clutch is disposed between the first motor and the first gearbox for selectively connecting the first motor to the first gearbox for driving the first housing member transversely relative to the web along the first rack.

The second driving means also includes a second motor and a second gearbox driven by the second motor. The second gearbox is drivingly connected to the second rack and a second clutch is disposed between the second motor and the second gearbox for selectively connecting the second motor to the second gearbox for driving the second housing member transversely relative to the web along the second rack.

In a more specific embodiment of the present invention, the first and second motors are stepping motors and the control means also includes a plurality of magnetic calibrations disposed along the first and second rails. The first control module also includes a first comparator for detecting and counting signals from the magnetic calibrations disposed along the first rail. The second control module also includes a second comparator for detecting and counting signals from the magnetic calibrations disposed along the second rail such that the first and second modules are sent to the designated locations along the rails using a predetermined number of stepping motor increments.

The communication bus means includes a communication bus and a power bus and the wear detection switch means also includes a proximity switch controlled by eddy currents generated in the vicinity of the slitter blade for positioning the slitter blade relative to the band.

The detailed description of the invention set forth hereinafter is intended as a description of the preferred embodiment of the present invention. Other means for carrying out the present invention will be apparent to those skilled in the art and are included within the spirit and scope of the present invention as defined by the appended claims.

DESCRIPTION OF THE PREFERRED EMBODIMENT

Figure 1:
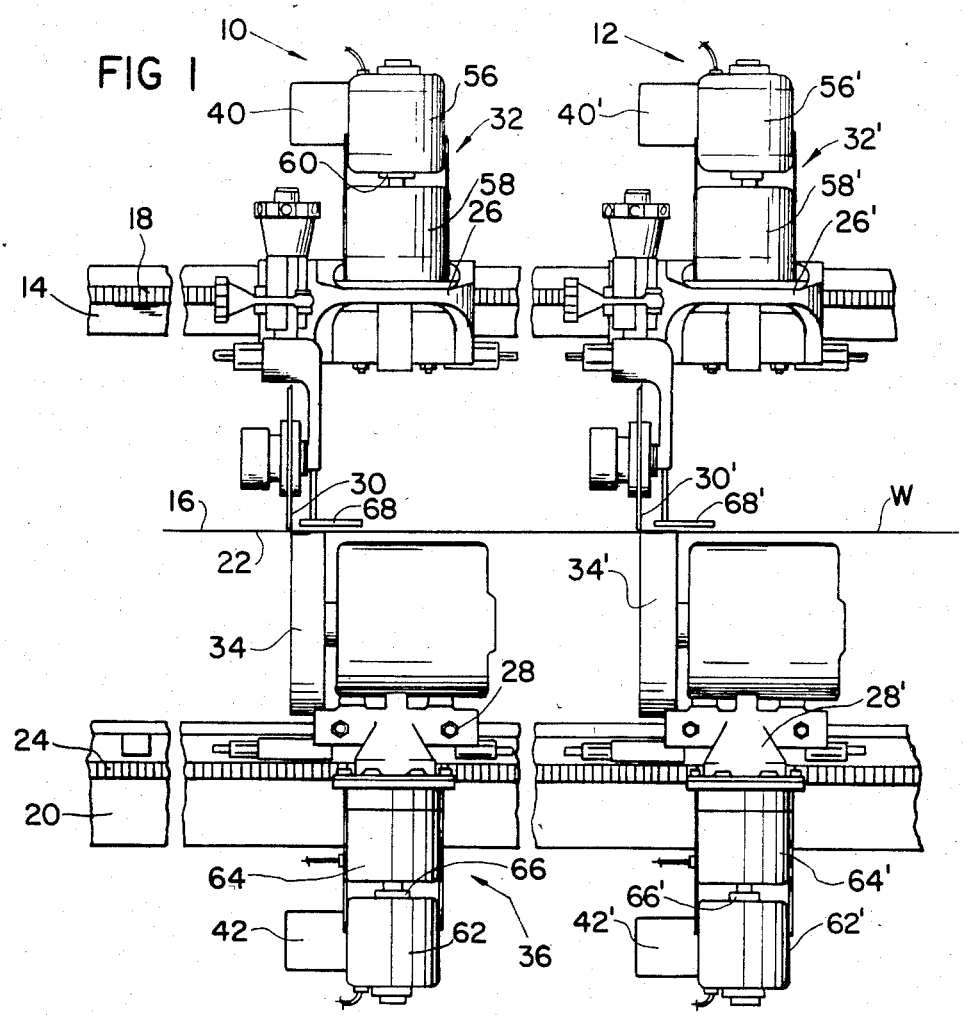
FIG. 1 is a front plan view of two adjacent slitter blades and corresponding slitter bands.

FIG. 1 is a front plan view of a first and second slitter generally designated 10 and 12. The slitter 10 includes a first rail 14 disposed adjacent to a first face 16 of the web W. The first rail 14 defines a first indexing rack 18. A second rail 20 is disposed adjacent to a second face 22 of the web W such that the first and second rails 14 and 20 respectively are disposed on opposite sides of the web W with the second rail 20 defining a second indexing rack 24. A first housing member generally designated 26 is movably connected to the first rail 14 such that the first housing member 26 moves transversely relative to the web W along the first indexing rack 18. A second housing member generally designated 28 is movably connected to the second rail 20 such that the second housing member 28 moves transversely relative to the web W along the second indexing rack 24. A slitter blade 30 is rotatably secured to the first housing member 26 for slitting the moving web W during movement of the web W between the slitter blade 30 and the second housing member 28. A first driving means generally designated 32 is secured to the first housing member 26 for driving the first housing member 26 and the slitter blade 30 transversely relative to the web W.

A slitter band 34 is secured to the second housing member 28 for cooperating with the slitter blade 30 for slitting the web W between the slitter blade 30 and the band 34. A second driving means generally designated 36 is secured to the second housing member 28 for driving the second housing member 28 and the band 34 transversely relative to the web W.

The second slitter 12 is identical to the first slitter 10 as shown in FIG. 1 and similar parts of the second slitter 12 are labeled with the same numerals as the parts designated relative to the first slitter 10, however, the suffix 1 has been added to the designated numerals of the second slitter 12.

Figure 2:
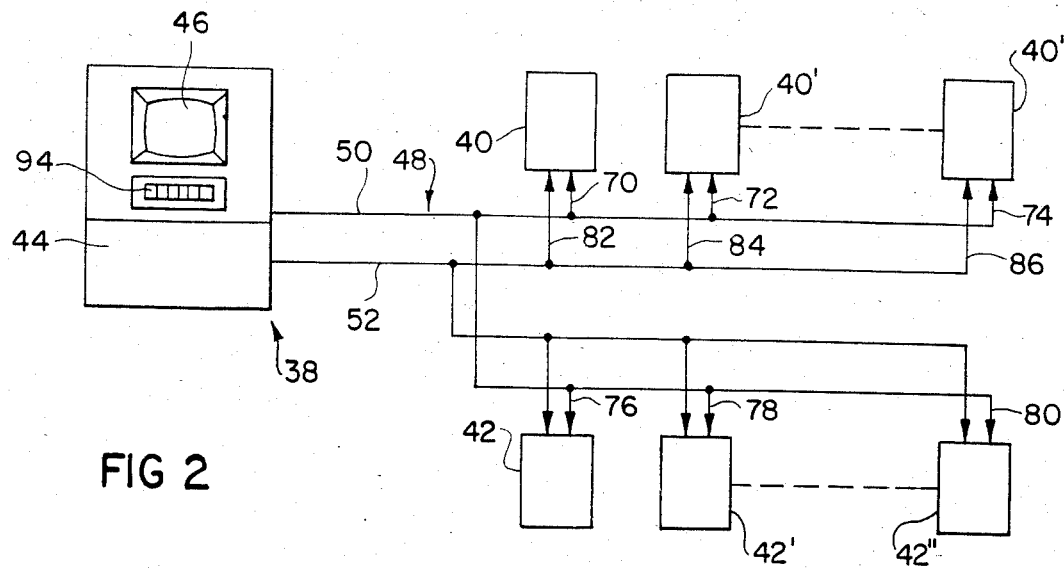
FIG. 2 is a block diagram illustrating a control computer of the subject invention together with electrical connections to a plurality of first and second modules.

FIG. 2 is an electronic block diagram illustrating a control computer and the electrical connections to a plurality of first and second modules.

More particularly, the control means generally designated 38 and shown in FIG. 2 is electrically connected to the first and second driving means 32 and 36 for selectively positioning the slitter blade 30 and band 34 adjacent to each other such that the web W moving between the slitter blade 30 and band 34 is sheared by the interaction of the slitter blade 30 with the band 34. The control means 38 also includes a first control module 40 shown in FIGS. 1 and 2. The first control module 40 is secured to the first driving means 32. A second control module generally designated 42 and shown in FIGS. 1 and 2 is secured to the second driving means 36. A digital control computer 44 is connected to the modules 40 and 42 for selectively controlling movement of the modules 40 and 42 by sending the modules 40 and 42 to a designated location as shown in FIG. 1 using a predetermined number of driving means increments. A monitor 46 is connected to the control computer 44 for displaying the positions of the slitter blade 30 and the band 34.

As shown in FIG. 2, a plurality of first and second modules are electrically connected to the computer 44. The first and second modules of the second slitter 12 are designated $40^1$ and $42^1$ respectively. As shown in FIG. 2, a plurality of first and second modules are connected to the digital control computer 44 according to the number of slitters provided in the slitting apparatus.

A communication bus means generally designated 48 and shown in FIG. 2 electrically connects the control computer 44 and the first modules 40, $40^1$ to $40^N$. Furthermore, the bus means 48 electrically connects the second modules 42, $42^1$ to $40^N$ for sequentially conducting control signals from the computer 44 to the modules 40, $40^1$, $40^N$, 42, $42^1$, and $42^N$ and for sequentially conducting command signals from the modules 40, $40^1$, $40^N$, 42, $42^1$, and $42^N$ to the computer 44 for positioning the slitter blades 30 and $30^1$ and the bands 34 and $34^1$ adjacent to each other.

Figure 3:
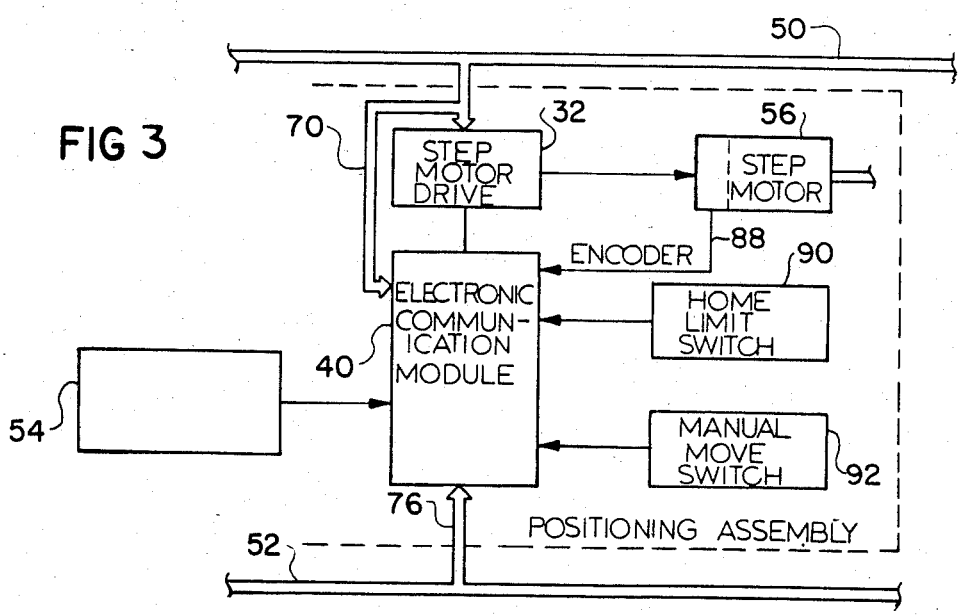
FIG. 3 is a block diagram of a portion of the subject invention showing a first module and associated blade wear switch.

FIG. 3 is a block diagram showing the communication bus means 48 including a first and a second conductor 50 and 52 respectively. The first conductor 50 of the bus means 48 is electrically connected to the first drive means 32 diagramatically represented in FIG. 3. Furthermore, the first conductor 50 is also connected to the first module 40 diagramatically represented in FIG. 3. The second conductor 52 is also connected to the first module 40 and a blade wear detection switch means generally designated 54 is disposed adjacent to the slitter blade 30 as shown in FIG. 1 and is electrically connected to the first module 40 for detecting slitter blade wear. The detection switch means 54 is electrically connected to the first control module 40 such that when the slitter blade 30 wears, a wear detection signal is generated and conducted from the first module 40 to the computer 44 for compensating for such slitter blade wear.

More specifically relative to FIG. 1, the first drive means 32 includes a first stepping motor 56 and a first gearbox 58 driven by the first motor 56. The first gearbox 58 is drivingly connected to the first rack 18. A first clutch 60 is disposed between the first motor 56 and the first gearbox 58 for selectively connecting the first motor 56 to the first gearbox 58 for driving said first housing member 26 transversely relative to the web W along the first rack 18.

Furthermore, the second driving means 36 includes a second stepping motor 62 and a second gearbox 64 driven by the second motor 62. The second gearbox 64 is drivingly connected to the second rack 24. A second clutch 66 is disposed between the second motor 62 and the second gearbox 64 for selectively connecting the second motor 62 to the second gearbox 64 for driving the second housing member 28 transversely relative to the web W along the second rack 24.

The control means 38 includes a plurality of magnetic calibrations disposed along the first and second racks 18 and 24 respectively and the first control module 40 also includes a first comparator for detecting and counting signals from the magnetic calibrations disposed along the first rack 18. The second control module 42 includes a second comparator for detecting and counting signals from the magnetic calibrations disposed along the second rack 24 such that the first and second modules 40 and 42 respectively are sent to the designated locations along the racks 18 and 24 respectively using a predetermined number of stepping motor increments.

The wear detection switch means generally designated 54 shown in FIGS. 1 and 3 includes a proximity switch 68 which is controlled by eddy currents generated in the vicinity of the slitter blade 30 for positioning the slitter blade 30 relative to the band 34.

The electronic control means 38, or main processor, is connected to each of the slitters 10 and 12 as shown in FIG. 2 by means of the conductors 50 and 52 respectively. In a particular system constructed according to the invention, a communication bus 50 comprised 10 wires and the power bus or conductor 52 comprised 6 wires. As shown in FIG. 2, the communication bus 50 is connected by segment 70 to the first module 40, segment 72 to module $40^1$ and segment 74 to module $40^N$. Similarly, segments 76, 78 and 80 are connected to second modules 42, $42^1$ and $42^N$ respectively. The power bus, or second conductor 52 is connected by segments 82, 84 and 86 to the first modules 40, $40^1$ and $40^N$ respectively and to the second modules 42, $42^1$ and $42^N$ respectively.

More particularly, FIG. 3 is a detailed view of the first module 40 which is connected by segment 70 of communication bus or first conductor 50 with the main processor or control means 38 as well as with its associated second module 42 as well as with the other modules. The module 40 also receives an input on segment 76 of power bus 52 and supplies output to the stepping motor drive means 32 which is connected to the stepping motor 56 which moves the blade 30 relative to the rack 18. An encoder 88 provides a feedback signal to the electronic communication module 40. A HOME limit switch 90 also supplies an input to the electronic communication module 40 and a manual MOVE switch 92 directly provides an input to the electronic communication module 40 to move the blade 30 manually.

Each electronic module has the capability of recognizing when the main processor or control means 38 wishes to communicate with that particular module and each electronic module has a switch selectable identification number or address which is unique. The main processor 38 decides which module it wishes to communicate with, addresses that module, then communicates with that module. This communication may be in either direction. The main control processor 38 can command an electronic module to accomplish a specific job and can also ask an electronic module questions concerning status at a particular time. By communicating with a number of electronic modules in an orderly fashion, the main processor 38 systematically moves the cutter blades 30 and $30^1$ and associated bands 35 and $34^1$ to desired locations.

In operation of the apparatus according to the present invention, when the operator desires to move the slitter blade 30 and slitter band, 34, he supplies this information into a keyboard 94 associated with the monitor 46. The main processor or control means 38 starts the procedure under the control of a computer program for communicating with each of the slitter blades and associated slitter bands. The first and second modules 40, $40^1$ and $40^N$, 42, $42^1$, and $42^N$ control their associated blade and bands to the designated locations.

In a particular application of the present invention, 256 electronic modules were utilized, all of which were connected to the same 16 wires. In one particular example, if the main control computer desires to move a particular assembly 8 inches (20.32 CMS) to the right and a second assembly 4 inches (10.16 CMS) to the left, the following operation is an illustration of the manner in which the sustem of the invention accomplishes this task.

1. The main controller computer (MCC) sends a signal to the electronic module (EM) to enable itself to accept communications.

2. The main controller issues a signal to a first electronic module to enable itself for a move in the direction to the right.

3. The main controller computer informs the second module to enable itself to accept communications.

4. The main controller computer issues instructions to the second module to enable itself for a move to the left.

5. The main controller computer generates step commands to move both the modules 4 inches (10.16 CMS 800 steps).

6. The main controller computer tells the second module to enable itself to accept communication.

7. The main controller computer tells the second module to disconnect itself since it has moved a total of 4 inches (10.16 CMS) which was required.

8. The main controller computer knowing that it must move the first module another 4 inches (10.16 CMS) and also knowing that it has already disconnected the second module so that it will not move any further, generates the remaining step command and supplies into the first module to move it the remaining 4 inches (10.16 CMS).

9. The main controller computer informs the first electronic module to prepare itself to accept communications.

10. The main controller computer informs the first module to disconnect itself since its move has now been completed.

11. The main controller computer then proceeds with other business as do the various electronic modules.

In the example given hereinbefore, the total time for completing steps 1 to 4, 6 to 7, and 9 and 10 is about 0.0005 seconds. Steps 5 and 8 each take about 1 second (assuming movement is approximately 4 inches/second, 10.16 CMS/second).

If a slitter apparatus has 5 slitting blades, the time taken to move all 5 slitters to new positions for the next cut is about 10 seconds. Such redeployment of the slitter blades is in contrast to conventional slitters wherein the setup of 5 new positions takes up to 10 minutes. Therefore, the present invention provides substantial savings in time over the prior art systems.

Although the invention has been described with a certain degree of particularity, it is understood that the present inventive concept may be modified within the scope of the invention as defined by the appended claims.

What is claimed is:

1. An apparatus for automatically controlling the position of a plurality of slitters for slitting a moving web, said apparatus comprising in combination:

a first rail disposed adjacent to a first face of the web, said first rail defining a first indexing rack;

a second rail disposed adjacent to a second face of the web such that said first and second rails are disposed on opposite sides of the web, said second rail defining a second indexing rack;

a first housing member movably connected to said first rail such that said first housing member moves transversely relative to the web along said first indexing rack;

a second housing member movably connected to said second rail such that said second housing member moves transversely relative to the web along said second indexing rack;

a slitter blade rotatably secured to said first housing member for slitting the moving web during movement of the web between said slitter blade and said second housing member;

a first driving means secured to said first housing member for driving said first housing member and said slitter blade transversely relative to the web;

a slitter band secured to said second housing member for cooperating with said slitter blade for slitting the web between said slitter blade and said band;

second driving means secured to said second housing member for driving said second housing member and said band transversely relative to the web;

electronic control means electrically connected to said first and second driving means for selectively positioning said slitter blade and band adjacent to each other such that the web moving between said slitter blade and band is sheared by the interaction of said slitter blade with said band;

said control means further including:

a first control module secured to said first driving means;

a second control module secured to said second driving means;

a digital control computer connected to said modules for selectively controlling movement of said modules by sending said modules to a designated location using a predetermined number of driving means increments;

a monitor connected to said control computer for displaying the positions of said slitter blade and said band;

a communication bus means for electrically connecting said control computer and said modules for sequentially conducting control signals from said computer to said modules and for sequentially conducting command signals from said modules to said computer for positioning said slitter blade and said band adjacent to each other; and wear detection switch means disposed adjacent to said slitter blade for detecting slitter blade wear, said detection switch means being electrically connected to said first control module such that when said slitter blade wears, a wear detection signal is generated and conducted from said first module to said computer for compensating for such slitter blade wear.

2. An apparatus for automatically controlling the position of a plurality of slitters as set forth in claim 1 wherein said first driving means further includes:

a first motor;

a first gearbox driven by said first motor, said first gearbox being drivingly connected to said first rack;

a first clutch disposed between said first motor and said first gearbox for selectively connecting said first motor to said first gearbox for driving said first housing member transversely relative to the web along said first rack.

3. An apparatus for automatically controlling the position of a plurality of slitters as set forth in claim 2 wherein said second driving means further includes:

a second motor;

a second gearbox driven by said second motor, said second gearbox being drivingly connected to said second rack;

a second clutch disposed between said second motor and said second gearbox for selectively connecting said second motor to said second gearbox for driving said second housing member transversely relative to the web along said second rack.

4. An apparatus for automatically controlling the position of a plurality of slitters as set forth in claim 3 wherein said first and second motors are stepping motors.

5. An apparatus for automatically controlling the position of a plurality of slitters as set forth in claim 4 wherein said control means further includes:

a plurality of magnetic calibrations disposed along the first and second rails;

said first control module further including:

a first comparator for detecting and counting signals from said magnetic calibrations disposed along said first rail;

said second control module further including:

a second comparator for detecting and counting signals from said magnetic calibrations disposed along said second rail such that said first and second modules are sent to said designated location along said rails using a predetermined number of stepping motor increments.

6. An apparatus for automatically controlling the position of a plurality of slitters as set forth in claim 1 wherein said communication bus means further includes:

a communication bus having ten electrical conductors;

a power bus having six electrical conductors.

7. An apparatus for automatically controlling the position of a plurality of slitters as set forth in claim 1 wherein said wear detection switch means further includes:

a proximity switch controlled by eddy currents disposed in the vicinity of said slitter blade for positioning said slitter blade relative to said band.

8. An apparatus for automatically controlling the position of a plurality of slitters for slitting a movind web, said apparatus comprising in combination:

a first rail disposed adjacent to a first face of the web, said first rail defining a first indexing rack;

a second rail disposed adjacent to a second face of the web such that said first and second rails are disposed on opposite sides of the web, said second rail defining a second indexing rack;

a first housing member movably connected to said first rail such that said first housing member moves transversely relative to the web along said first indexing rack;

a second housing member movably connected to said second rail such that said second housing member moves transversely relative to the web along said second indexing rack;

a slitter blade rotatably secured to said first housing member for slitting the moving web during movement of the web between said slitter blade and said second housing member;

a first driving means secured to said first housing member for driving said first housing member and said slitter blade transversely relative to the web;

said first driving means further including:

a first stepping motor;

a first gearbox driven by said first motor, said first gearbox being drivingly connected to said first rack;

a first clutch disposed between said first motor and said first gearbox for selectively connecting said first motor to said first gearbox for driving said first housing member transversely relative to the web along said first rack:
a slitter band secured to said second housing member for cooperating with said slitter blade for slitting the web between said slitter blade and said band;
second driving means secured to said second housing member for driving said second housing member and said band transversely relative to the web;
said second driving means further including:
a second stepping motor;
a second gearbox driven by said second motor, said second gearbox being drivingly connected to said second rack;
a second clutch disposed between said second motor and said second gearbox for selectively connecting said second motor to said second gearbox for driving said second housing member transversely relative to the web along said second rack;
electronic control means electrically connected to said first and second driving means for selectively positioning said slitter blade and band adjacent to each other such that the web moving between said slitter blade and band is sheared by the interaction of said slitter blade with said band;
said control means further including:
a first control module secured to said first driving means;
a second control module secured to said second driving means;
a digital control computer connected to said modules for selectively controlling movement of said modules by sending said modules to a designated location using a predetermined number of driving means increments;
a monitor connected to said control computer for displaying the positions of said slitter blade and said band:
a communication bus means for electrically connecting said control computer and said modules for sequentially conducting control signals from said computer to said modules and for sequentially conducting command signals from said modules to said computer for positioning said slitter blade and said band adjacent to each other; and
wear detection switch means disposed adjacent to said slitter blade for detecting slitter blade wear, said detection switch means being electrically connected to said first control module such that when said slitter blade wears, a wear detection signal is generated and conducted from said first module to said computer for compensating for such slitter blade wear.

9. An apparatus for automatically controlling the position of a plurality of slitters for slitting a moving web, said apparatus comprising in combination:
a first rail disposed adjacent to a first face of the web, said first rail defining a first indexing rack;
a second rail disposed adjacent to a second face of the web such that said first and second rails are disposed on opposite sides of the web, said second rail defining a second indexing rack;
a first housing member movably connected to said first rail such that said first housing member moves transversely relative to the web along said first indexing rack;
a second housing member movably connected to said second rail such that said second housing member moves transversely relative to the web along said second indexing rack;
a slitter blade rotatably secured to said first housing member for slitting the moving web, during movement of the web between said slitter blade and said second housing member;
a first driving means secured to said first housing member for driving said first housing member and said slitter blade transversely relative to the web;
said first driving means further including:
a first stepping motor;
a first gearbox driven by said first motor, said first gearbox being drivingly connected to said first rack;
a first clutch disposed between said first motor and said first gearbox for selectively connecting said first motor to said first gearbox for driving said first housing member transversely relative to the web along said first rack;
a slitter band secured to said second housing member for cooperating with said slitter blade for slitting the web between said slitter blade and said band;
second driving means secured to said second housing member for driving said second housing member and said band transversely relative to the web;
said second driving means further including:
a second stepping motor;
a second gearbox driven by said second motor, said second gearbox being drivingly connected to said second rack;
a second clutch disposed between said second motor and said second gearbox for selectively connecting said second motor to said second gearbox for driving said second housing member transversely relative to the web along said second rack;
electronic control means electrically connected to said first and second driving means for selectively positioning said slitter blade and band adjacent to each other such that the web moving between said slitter blade and band is sheared by the interaction of said slitter blade with said band;
said control means further including:
a first control module secured to said first driving means;
a second control module secured to said second driving means;
a digital control computer connected to said modules for selectively controlling movement of said modules by sending said modules to a designated location using a predetermined number of driving means increments;
a monitor connected to said control computer for displaying the positions of said slitter blade and said band;
a communication bus means for electrically connecting said control computer and said modules for sequentially conducting control signals from said computer to said modules and for sequentially conducting command signals from said modules to said computer for positioning said slitter blade and said band adjacent to each other;
wear detection switch means disposed adjacent to said slitter blade for detecting slitter blade wear, said detection switch means being electrically connected to said first control module such that when said slitter blade wears, a wear detection signal is generated and conducted from said first module to said computer for compensating for such slitter blade wear, and said wear detection means further including:
a proximity switch controlled by eddy currents generated in the vicinity of said slitter blade for positioning said slitter blade relative to said band.

* * * * *